US006969547B2

(12) United States Patent
Damast

(10) Patent No.: US 6,969,547 B2
(45) Date of Patent: Nov. 29, 2005

(54) METHOD AND ARTICLE FOR SECURING ORNAMENTAL BUNTING AND ORNAMENTAL BUNTING MADE BY THE METHOD

(75) Inventor: Abraham Damast, Great Neck, NY (US)

(73) Assignee: Commodiere Manufacturing Corporation, NY (US)

(*) Notice: Subject to any disclaimer, the term of this patent is extended or adjusted under 35 U.S.C. 154(b) by 35 days.

(21) Appl. No.: 10/649,942

(22) Filed: Aug. 28, 2003

(65) Prior Publication Data

US 2005/0048255 A1   Mar. 3, 2005

(51) Int. Cl.⁷ ................................. B32B 3/06
(52) U.S. Cl. .................. 428/99; 428/181; 160/134; 24/499; 24/507
(58) Field of Search ............... 428/99, 12, 181; 416/73; 160/134; 24/703.1, 703.2, 499, 507

(56) References Cited

U.S. PATENT DOCUMENTS

| | | | |
|---|---|---|---|
| 181,513 A | 8/1876 | Young | |
| D32,268 S | 2/1900 | Giebel | |
| 835,433 A | 11/1906 | Hulsizer | |
| 1,533,396 A * | 4/1925 | Dabney | 416/73 |
| 2,136,925 A | 11/1938 | Ristell et al. | |
| 2,864,092 A | 12/1958 | Hurst | |
| 4,699,195 A | 10/1987 | Lester | |
| 5,002,112 A | 3/1991 | Schnebly et al. | |
| D413,832 S | 9/1999 | Etzion | |
| 6,020,037 A | 2/2000 | Etzion | |

* cited by examiner

Primary Examiner—Alexander S. Thomas
(74) Attorney, Agent, or Firm—Dickstein, Shapiro, Morin & Oshinsky, LLP.

(57) ABSTRACT

An ornamental bunting includes: a length of fabric folded to form a plurality of pleats; and a crimping member having a pair of wings each having a row of teeth. The crimping member is operable upon application of an inwardly compressive force to substantially permanently deform from an open position to a closed position in which the rows of teeth are brought in close proximity to one another to maintain an end of length of fabric in a gathered condition between the rows of teeth.

12 Claims, 4 Drawing Sheets

METHOD AND ARTICLE FOR SECURING ORNAMENTAL BUNTING AND ORNAMENTAL BUNTING MADE BY THE METHOD

BACKGROUND OF THE INVENTION

1. Field of the Invention

This invention relates to decorative items, and more particularly, to an ornamental bunting formed from a length of fabric, an improved method of making an ornamental bunting, and an improved clamp for securing material of the fabric to form the bunting.

2. Description of the Related Art

Ornamental buntings of the type typically seen at events associated with festivities, such as the Fourth of July or the World Series, are formed by folding generally rectangular fabric, usually decorated brightly, into pleats and securing the pleats at one end together to allow the other end to be spread out in a fan shape. However, traditional methods of manufacturing such buntings require complex and time consuming folding and stitching operations, making manufacturing quite expensive. In particular, securing the pleats at the one end has been performed by a stitching process.

One prior art method aimed at reducing the cost of manufacture of such buntings is shown in U.S. Pat. No. 6,020,037 to Etzion. In that patent, as shown in FIG. 1, each of the pleats of a folded length of fabric is formed so as to have an aperture therethrough, and a ring-shaped member is provided that passes through all of the apertures to maintain the end of the length of fabric in a gathered condition.

However, this method does not evenly gather the ends of the fabric to form an attractive bunting, at least because the ends of the pleats are not securely, tightly and evenly gathered across the width of each pleat. As a result, a bunting made by this method has a loose and unfinished appearance. Further, the nature of fastening by means of a ring requires the placement of a plurality of holes at one end of the fabric, in particular one hole for each pleat, together with an associated grommet for each hole, because each hole bears a portion of the weight of the bunting when the bunting is hung.

SUMMARY OF THE INVENTION

It is an object of the invention to provide an article and a method for forming and securing an ornamental bunting that allows the ornamental bunting to be manufactured conveniently and inexpensively.

It is a further object of the invention to provide an ornamental bunting that has a pleasing and neat appearance.

According to an aspect of the invention, there is provided an ornamental bunting, including a length of fabric folded to form a plurality of pleats, and a toothed crimping member which may be deformed inwardly to maintain end pleats of the length of fabric in a gathered condition.

According to another aspect of the invention, there is provided a toothed crimping member, including dual rows of teeth, which, upon a deformation of the crimping member, are brought in close proximity to one another to provide for a clamping action to maintain the end of a length of fabric in a gathered condition.

BRIEF DESCRIPTION OF THE DRAWINGS

For the purposes of illustrating the present invention, there is shown in the drawings a form which is presently preferred, it being understood however, that the invention is not limited to the precise form shown by the drawing in which.

DESCRIPTION OF THE PREFERRED EMBODIMENTS

Figure 1:
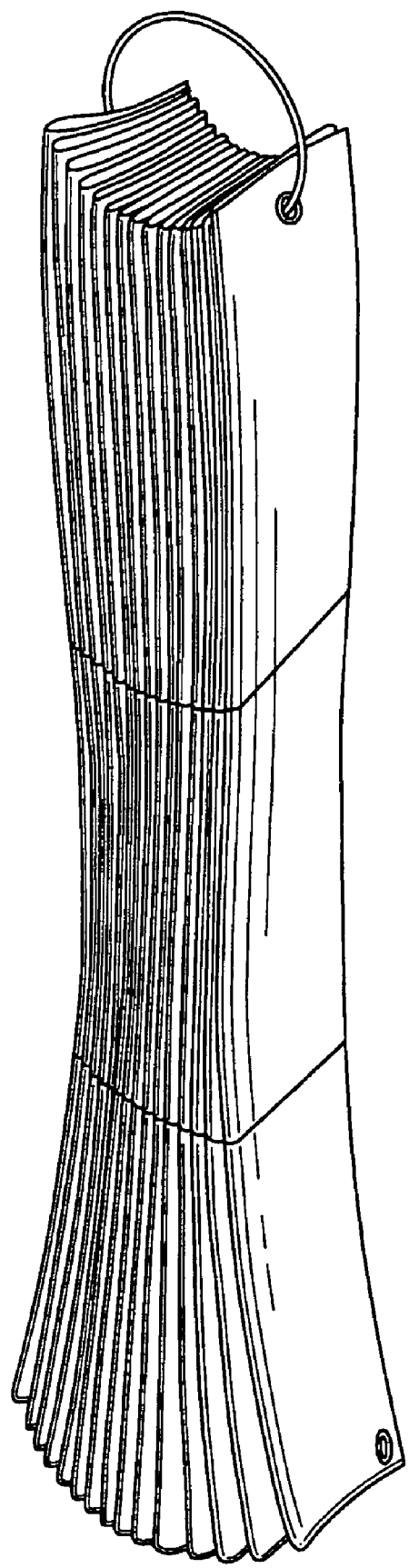
FIG. 1 is a partial perspective view of a prior art method of securing together end pleats of a fabric to form a bunting.
Figure 2:
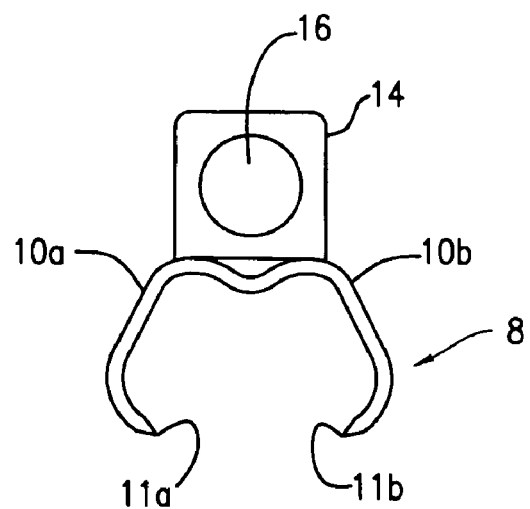
FIG. 2 is a front elevational view of crimping member for securing end pleats of a fabric to form an ornamental bunting provided in accordance with the present invention, the crimping member being shown in the open position.

A clamp or crimping member 8 provided in accordance with the present invention is shown in front view in FIG. 2. The same member is shown in perspective in FIG. 3. In accordance with the present invention, the crimping member 8 is used to secure pleat ends of a bunting tightly together at one end of the fabric from which the bunting is formed.

Figure 3:
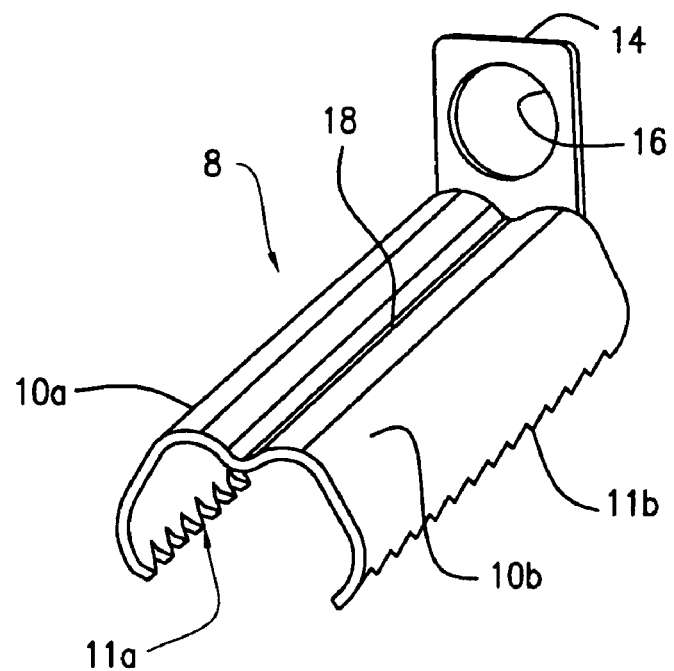
FIG. 3 is a perspective view of the crimping member shown in FIG. 2.

As can be seen from those FIGS. 2 and 3, the crimping member 8 is formed from a substantially rectangular piece of metal that has been formed so as to have wings 10a and 10b, rows of teeth 11a and 11b, a valley, or rib 18, formed along a top portion of the member and extending along its length, and a hanger hole extension 14 having a hole 16.

The metal used for the crimping member preferably has a low degree of springiness, to allow for a substantially permanent crimping inward of the wings 10a and 10b, to bring the rows of teeth 11a and 11b in closer proximity to one another, upon application to the crimping member 8 of an inwardly directed compressive crimping force. The application of the crimping force causes material that has been placed between the rows of teeth to be securely gripped, as will be explained in more detail below. As will be understood, metal with excessive memory characteristics, such as the material commonly used in springs, will be less than ideal for this purpose.

The hanger hole extension 14 is formed from a tab of metal that has been bent upwardly and a hole 16 having been formed therethrough. The hanger hole extension serves at least two advantageous functions. First, the hole allows a finished product using the crimping member 8 to be conveniently displayed, for example in a store, sliding the finished product onto a display rod. Second, the hole allows a fastener to be affixed therethrough in hanging the finished product, in the examples discussed below a bunting, to a wall or other structure.

Figure 4:
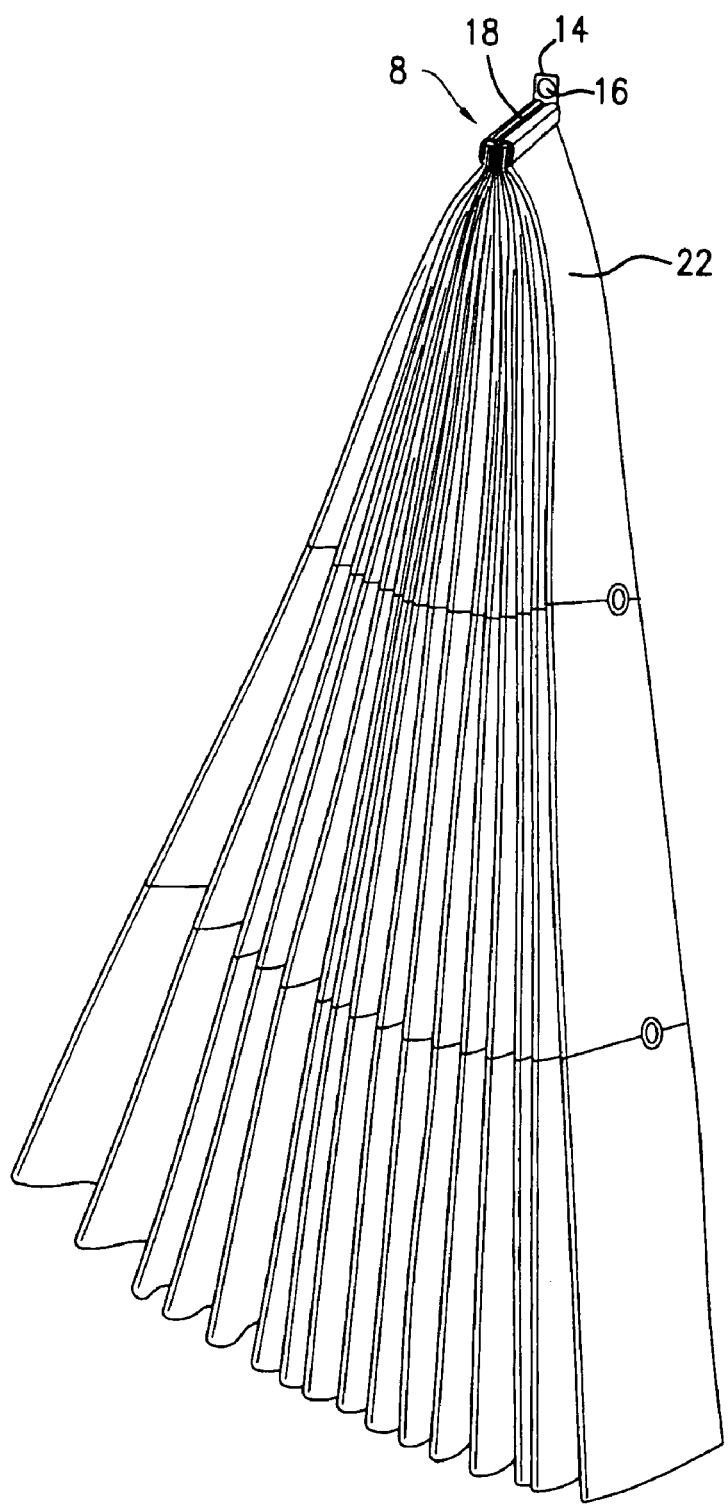
FIG. 4 is a perspective view of an ornamental bunting with pleats secured at one end by a crimping member in the closed condition in accordance with the present invention.

As can be seen in FIG. 4, the bunting of the present invention is formed by securing the crimping member 8 at one end of the folded bunting fabric 22. The folded bunting fabric 22 has been folded so as to have multiple pleats. At one end, the pleats are gathered together and placed between the rows of teeth 11a and 11b. A compressive force is inwardly applied to the wings 10a and 10b of the crimping member 8 to substantially permanently deform the wings inwardly, causing a gripping force to be applied to the gathered pleat ends by the close proximity of the rows of teeth to one another caused by the application of the force.

That is, the teeth of the crimping member, after compression, are substantially permanently caused to be in gripping contact with sides of the gathered pleats of the fabric to hold the gathered fabric ends between the rows of teeth securely and neatly in place. The plural teeth provide for a very tight, secure grip on the fabric.

A valley 18 formed along the top of the crimping member 8 advantageously allows for a tighter, more effective closing of the crimping member 8 on the material by decreasing the amount of empty space inside the closed crimping member 8 in the closed position, resulting in a snugger, more secure fit within the crimping member 8. In addition, the valley 18 is a rib in the metal of the clamp 18, which greatly strengthens the metal, making it resistant to inadvertent opening.

Figure 5:
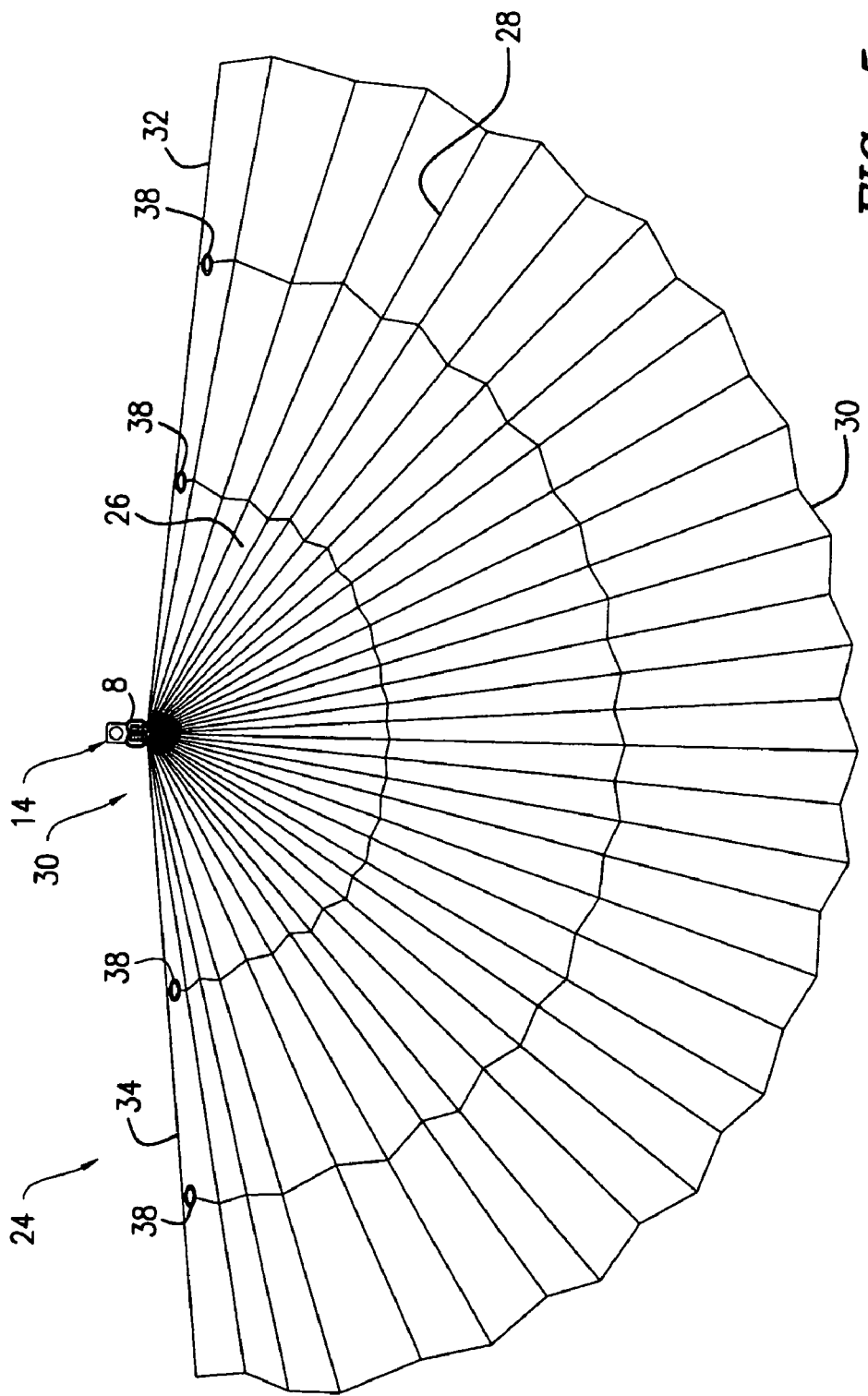
FIG. 5 is a front elevational view of an ornamental bunting the pleat ends of which are secured in accordance with the present invention.

An ornamental bunting constructed in accordance with the present invention is shown in front view in FIG. 5 and is generally indicated by reference numeral 24.

The bunting 24 is formed from a rectangular length of fabric 26 folded to form a plurality of pleats 28. A long side of the length of fabric 26 is held in a gathered condition, as referenced by numeral 30, by the crimping member 8, which securely and grippingly holds the pleats at one end of the length of fabric in very tight proximity to one another. The opposite side 30 of the length of fabric is allowed to spread to form a substantially semi-circular perimeter so that the bunting 24 as a whole is generally fan shaped. The pleats 28 are formed in the length of fabric 26 by a series of alternating folds, as is well known.

Edges 32 and 34 of the bunting 24, which are the short sides of the length of fabric 26 in the embodiment shown in the figures, extend outwardly in respective opposite directions from the crimping member 8 to form a diameter in relation to the semi-circular perimeter formed by the side 30 of the length of fabric 26.

To provide for secure mounting of the bunting to a wall or other structure, a series of holes, preferably having grommets 38, are formed along each of the edges 32 and 34. As will be understood, the grommets 38 are structured, in conjunction with the aforementioned hole 16, to receive fasteners such as nails, tacks or wires, allowing the aforementioned mounting of the bunting.

In order to provide a decorative appearance, the length of fabric 26 may be decorated in any desired manner. It may also include any desired wording. It should be understood that the bunting need not be decorated in the manner described above, or at all and the above-described decorations are for illustrative purposes only.

The bunting can be transformed from an opened condition (FIG. 5) to a closed condition (shown in FIG. 4) by gathering and folding together the free ends of the pleats 28.

Various changes to the foregoing article of manufacture may be introduced without departing from spirit and scope of the present invention. The above-described embodiments are strictly illustrative in nature and do not limit the invention, the scope of which is defined in the following claims.

What is claimed is:

1. An ornamental bunting, comprising:
a length of fabric folded to form a plurality of pleats; and
a clamp compressively holding one end of each of the pleats together so that the opposite end of each of the pleats can be fanned out relative to the clamp, the clamp comprising a pair of wings, the clamp being operable upon application of an inwardly compressive force to substantially permanently deform from an open position to a closed position in which the wings are brought in proximity to one another to maintain an end of the length of fabric in a gathered condition between the wings, wherein each of the wings has a row of teeth, the rows of teeth being brought in proximity to one another in the closed position.

2. The ornamental bunting according to claim 1, wherein the clamp further comprises a valley formed lengthwise along a top of the clamp.

3. An ornamental bunting according to claim 1, wherein the clamp further comprises a hanger hole.

4. An ornamental bunting according to claim 3, wherein the hanger hole is formed in a hanger hole extension having a hole formed therein, the hanger hole extension being formed of a same piece of metal as the clamp at an end thereof.

5. An ornamental bunting according to claim 1, wherein the length of fabric has first and second lateral edges extending outwardly from the clamp; and a plurality of spaced-apart holes, each having an associated grommet, are formed along each of the first and second edges, the plurality of holes and associated grommets being operable to receive fasteners for mounting the bunting to a surface.

6. An ornamental bunting, the bunting comprising:
a length of fabric folded to form a plurality of pleats; and
means for compressively securing one end of the length of fabric in a gathered condition, the means for compressively securing comprising a pair of wings, and being operable upon application of an inwardly compressive force to substantially permanently deform from an open position to a closed position in which the wings are brought in proximity to one another to maintain an end of the length of fabric in a gathered condition between the wings, each of the wings each having a row of teeth, the rows of teeth being brought in proximity to one another in the closed position.

7. An ornamental bunting, comprising:
a length of fabric folded to form a plurality of pleats;
a clamp compressively holding one end of each of the pleats together along a line so that the opposite end of each of the pleats can be fanned out relative to the clamp, said clamp comprising a pair of wings, the clamp being operable upon application of an inwardly compressive force to substantially permanently deform from an open position to a closed position in which the wings are brought in close proximity to one another to maintain an end of the length of fabric in a gathered condition between the wings, wherein each of the wings has a row of teeth, the rows of teeth being brought in proximity to one another in the closed position; and
a hanger opening adapted to receive a projection extending parallel to the line.

8. The ornamental bunting of claim 7, wherein the hanger opening is integral with the clamp.

9. The ornamental bunting of claim 8, wherein the fabric extends downwardly from the clamp and the hanger opening extends upwardly from the clamp.

10. The ornamental bunting of claim 7, wherein the hanger opening lies in a plane located perpendicular to the line.

11. The ornamental bunting of claim 10, wherein the hanger opening is a flat piece of metal having a circular opening therein and wherein the line extends parallel to the axis of the circular opening.

12. The ornamental bunting of claim 7, wherein the length of fabric has first and second lateral edges extending outwardly from the clamp; and a plurality of spaced-apart holes, each having an associated grommet, are formed along each of the first and second edges, the plurality of holes and associated grommets being operable to receive fasteners for mounting the bunting to a surface.

* * * * *

UNITED STATES PATENT AND TRADEMARK OFFICE
CERTIFICATE OF CORRECTION

PATENT NO. : 6,969,547 B2  Page 1 of 1
DATED : November 29, 2005
INVENTOR(S) : Abraham Damast It is certified that error appears in the above-identified patent and that said Letters Patent is hereby corrected as shown below:

Title page,
Item [73], Assignee, should read -- Commodore Manufacturing Corporation, NY (US) --.

Signed and Sealed this

Seventh Day of March, 2006

JON W. DUDAS
*Director of the United States Patent and Trademark Office*